POURING SPOUTS FOR CONTAINERS

Filed Jan. 18, 1965 7 Sheets-Sheet 1

HANS IVAR WALLSTÉN
INVENTOR.

BY Albert M. Parker
ATTORNEY.

POURING SPOUTS FOR CONTAINERS.

Filed Jan. 18, 1965 7 Sheets-Sheet 2

HANS IVAR WALLSTEN
INVENTOR.
BY Albert M. Parker
ATTORNEY.

HANS IVAR WALLSTEN
INVENTOR.

BY Albert M. Parker
ATTORNEY.

POURING SPOUTS FOR CONTAINERS.

Filed Jan. 18, 1965 7 Sheets-Sheet 4

HANS IVAR WALLSTEN
INVENTOR.
BY Albert M. Parker
ATTORNEY.

HANS IVAR WALLSTEN
INVENTOR.

BY Albert M. Parker
ATTORNEY.

HANS IVAR WALLSTEN
INVENTOR.
BY Albert M. Parker
ATTORNEY.

Jan. 10, 1967 H. I. WALLSTÉN 3,297,227

POURING SPOUTS FOR CONTAINERS.

Filed Jan. 18, 1965 7 Sheets-Sheet 7

HANS IVAR WALLSTÉN
INVENTOR.

BY Albert M. Parker
ATTORNEY.

United States Patent Office 3,297,227
Patented Jan. 10, 1967

3,297,227
POURING SPOUTS FOR CONTAINERS
Hans I. Wallsten, Dals-Langed, Sweden
Filed Jan. 18, 1965, Ser. No. 426,202
Claims priority, application Sweden, Jan. 16, 1964, 548/64
4 Claims. (Cl. 229—17)

The present invention concerns the simplification of the opening and possibly reclosing of a container for a liquid, a free-running material, or the like. Such containers may for example be produced from paperboard which is coated internally with plastic, wax, etc. A particular object of the invention is to enable opening of the container without using any tool. A further object of the invention is to provide a spout for dispensing the liquid from the container and providing that the spout when in a retracted position is protected from soiling during distribution and storage of the container.

In principle, the container is of the type where two opposite sides of the container's upper section at the opening end form a triangle which is constructed by bending these sides toward each other during the manufacture and sealing of the container while leaving a portion above these triangle forming sides to serve as a closure.

According to the invention at least one slit is located in or near one or both of the triangles. This slit may be a simple continuous slit or a discontinuous, interrupted slit composed of a plurality of small perforations or a combination of small perforations and larger openings. This slit is covered by a sealing layer on the inside of the container and/or on the outside of the container. When this sealing layer is loosened or broken through, the interior of the container becomes accessible for discharging its contents while at the same time the triangular side near the slit can be folded out to form a spout to facilitate pouring.

The invention finds particular use in containers made of paperboard or the like comprising a tubular body with polygonal or circular cross-section having for example a rectangular, square or circular bottom and a top section formed by bending inward four opposing side surfaces and closing them in a known manner as described hereinafter.

The invention may be applied to containers made from individual sheets or from continuous webs, for example according to U.S. patent application Serial No. 277,918, filed May 3, 1963, now Patent No. 3,263,391.

Some embodiments of the invention will be described with reference to the accompanying drawings, in which:

FIGURES 1 and 2 diagrammatically shows a carton or paper board blank in a flat condition furnished with means according to the present invention.

FIGURES 8*a*–8*c*, 9*a*–9*d*, 10*a*–10*c*, 11–14 and 15*a*–15*c* show various embodiments of the opening arrangement proper.

Figure 15B:
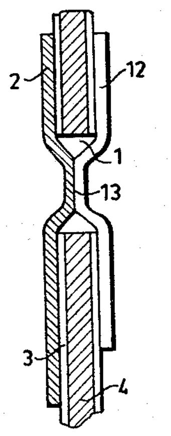
Figure 15A:
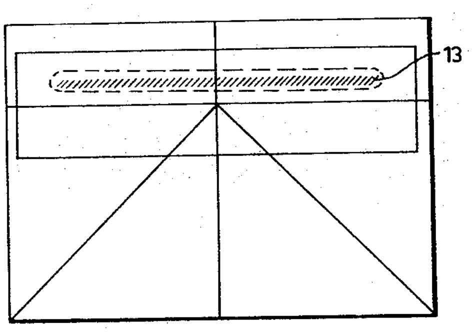
Figure 15C:
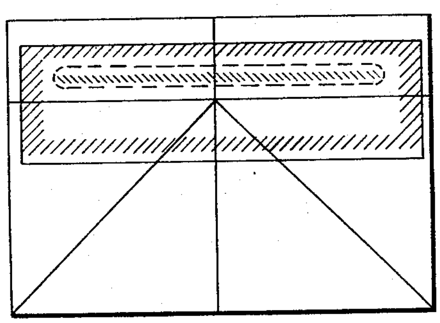
Figure 16:
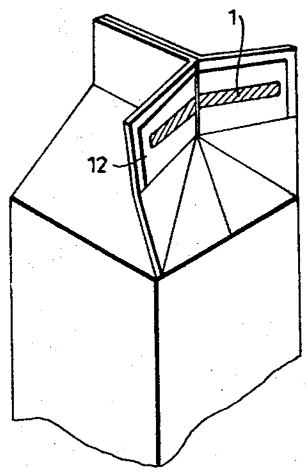
Figure 17:
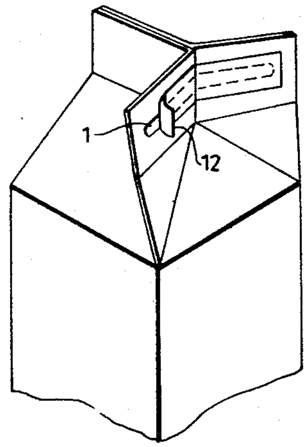

FIGURES 16 and 17 show how the container of FIGS. 15*a*–15*c* is opened.

Figure 18:
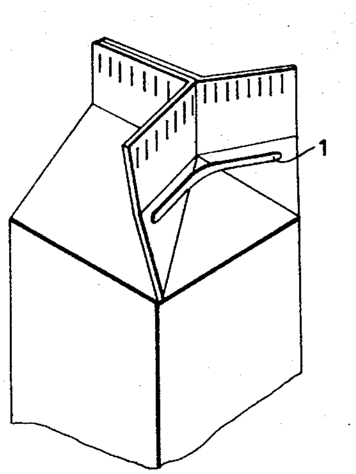
Figure 19:
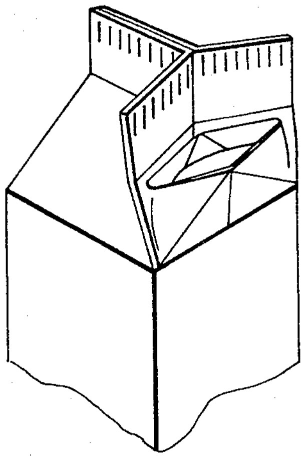
Figure 10A:
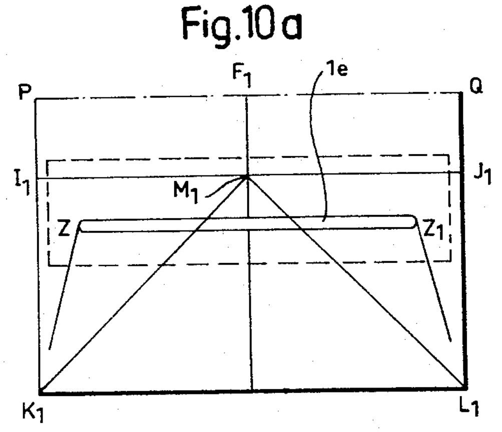
Figure 10B:
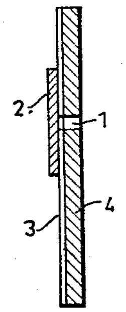
Figure 10C:
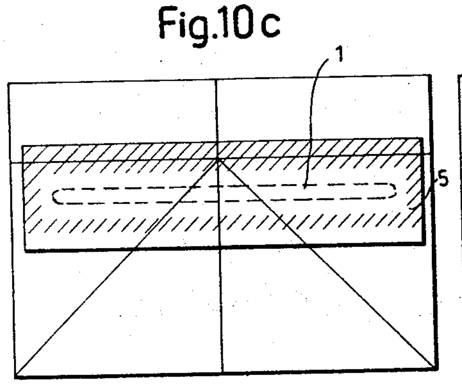

FIGURES 18 and 19 show how the container of FIGS. 10*a*–10*c* is opened.

Figure 1:
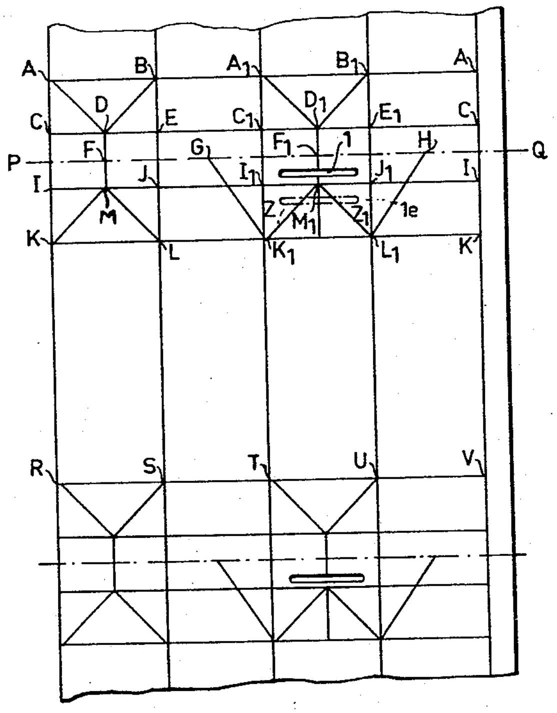
Figure 3:
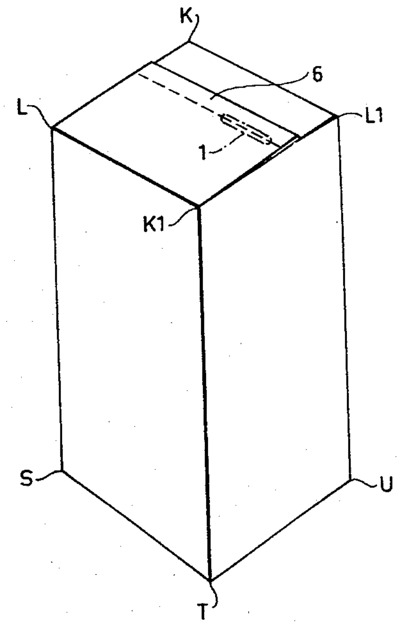
FIGURE 3 shows a finished container with a substantially flat top section.

FIGURE 1 illustrates part of a continuous web of carton material for producing containers or packages having quadrilateral cross sections. The figure shows the several foldlines along which the paperboard material is folded during the formation of the carton. In this case the carton is formed with four pair-wise opposing rectangular sides KLRS, $LK_1ST$, $K_1L_1TU$ and $L_1KUV$. The web material is folded along the vertical folding lines and the two outer edges of the web are joined and sealed to each other so that the material is shaped into a tube having a quadrilateral cross section. The folding process is continued to form a bottom for the container and simultaneously form a top for the subsequent container. This folding is carried out in such a way that the pairwise opposing sides are folded toward each other along folding lines (C–E, I–J; A–B, K–L for one pair of sides and $E_1$–C, $J_1$–I; $B_1$–A, $L_1$–K for the other pair of sides) perpendicular to the longitudinal axis of the tubular blank of cardboard material. These folding lines are spaced from each other at distances CI, AC and IK for one pair of sides and $E_1J_1$, $E_1B_1$ and $J_1L_1$ for the other pair of sides. At the same time folds are formed in one pair of sides in the shape of triangles ADB, $A_1D_1B_1$, KML, and $K_1M_1L_1$ the bases of which are formed by the outer parallel fold lines A–B, $A_1$–$B_1$, K–L, and $K_1$–$L_1$ of this pair of sides and the apexes D,$D_1$,M, and $M_1$ of which are pointed toward each other and located at the mid-points of the inner parallel folding lines C–E, $C_1$–$E_1$, I–J, and $I_1$–$J_1$. The apexes on opposite sides of the container are moved toward each other simultaneously with folding the web material between the inner parallel lines C–E, I–J about the line D–M (which is the longitudinal center line of one side of the container) and the web material between the inner parallel lines $C_1$–$E_1$, $I_1$–$J_1$ is folded about line $D_1$–$M_1$ (which forms a longitudinal center line for the opposite side of the container). In this way the folds along lines D–M, $D_1$–$M_1$ and along lines C–E, $E_1$–$C_1$, I–J, and $J_1$–$I_1$ are brought into contact with each other and partly closed against each other to achieve a tight bottom closure on one container and at the same time achieve a tight top closure on the following container (the bottom of which was formed and sealed at a similar earlier folding and sealing operation). After this the connected containers are separated from each other along mid-line P–Q between the two containers. It is realized that the upward projection of the top of the container is determined by choosing the distance I–K between lines I–J and K–LI in relation to the distance I–M which is half of I–J. A container with a flat top (see FIG. 3) is obtained if the distance I–K is chosen to be equal to I–M and M–J. The upright tab bounded by lines I–I and P–Q, which is formed when the containers are separated along line P–Q, can be folded to one side so that an entirely flat upper surface is obtained. An example of such a container is shown in perspective in FIG. 3 where the top tab, folded to the side, is shown at 6.

Figure 8A:
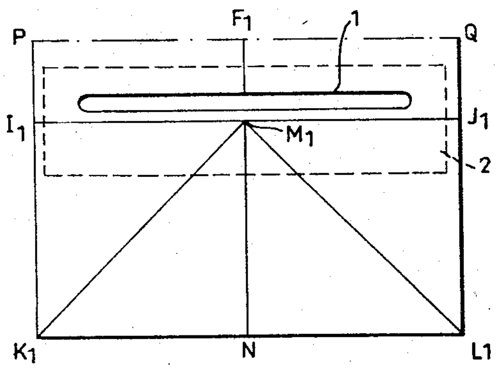
Figure 8B:
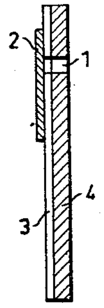
Figures 8C, 9D:
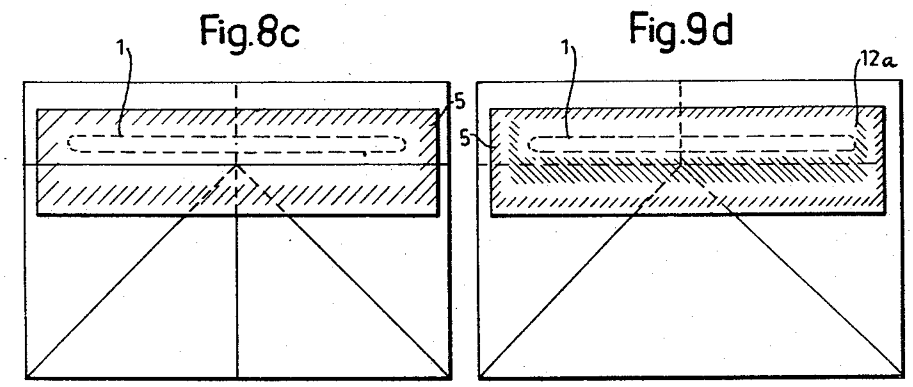

According to one embodiment of the invention at least one suitably straight slit or slot extends through the cardboard material (see FIG. 1). This slit may be parallel to fold-line I–I and somewhat shorter than distance $I_1J_1$ and be located directly above line I–I but below line P–Q. FIGURES 8*a*–8*c* illustrate more in detail the pertinent part of the cardboard material according to FIG. 1. FIG. 8*a* shows the outside of this part on a larger scale. FIG. 8*b* shows a cross sectional view of the material according to FIG. 8*a*, but the thickness of the wall of the container is shown considerably exaggerated for the sake of clarity. FIG. 8*c* shows the same container viewed from the inside. According to FIG. 8*b* the cardboard material 4 is coated on the inside with a plastic layer 3. For example this layer may be of thermoplastic material. The slit 1 can be formed by a punching process to obtain the desired width. A cover sheet, ribbon or strip 2 of suitable material, e.g. aluminum foil is pasted or sealed against the coated inside of the cardboard material in registering position in relation to the slit in order to form a seal against leakage of the substance (e.g. a liquid) contained in the container. The hatched area 5 (FIG. 8*c*) shows where the pasting or sealing between the cover strip 2 and the coating 3 suitably should be located.

It was stated above how a container can be formed according to FIG. 1 and how the shape of the top of the container from flat (FIG. 3) to more or less gable shape (FIG. 4) is determined by making the distance I–K greater than I–M. In the gable shaped embodiment according to FIG. 4 there will be obtained an upright tab 7 in which the slit 1 is concealed from the outside. The invention can be carried out regardless of the shape of the container top.

Figure 4:
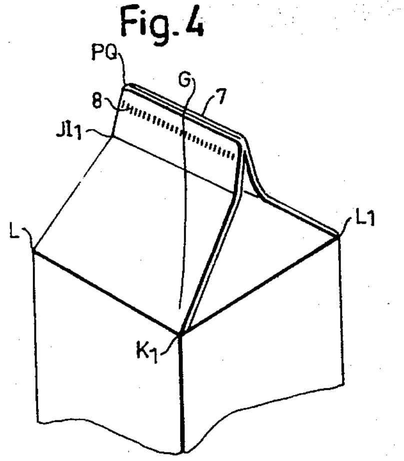
FIGURES 4–7 show how the top of a container is opened and how a foldable pouring spout is formed according to one embodiment of the invention.
Figure 5:
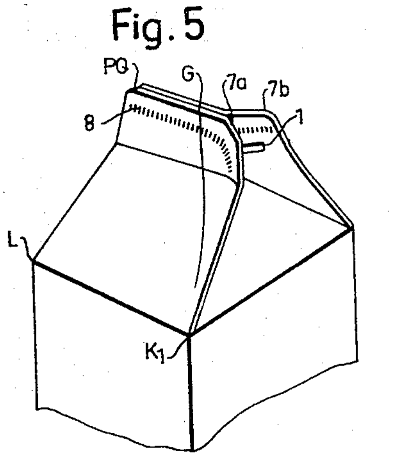
Figure 6:
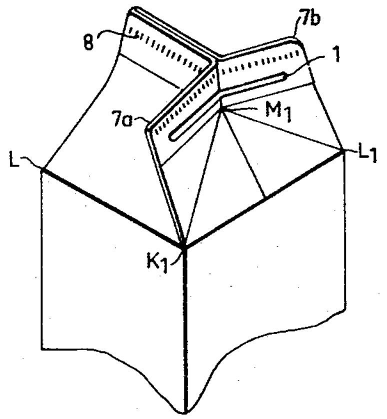

FIGURES 4–7 illustrate how the container is opened using the slit in accordance with the invention. In this respect FIG. 4 can be considered as representing either an embodiment with an initial gable shaped top and upright tab 7 in a completely unopened condition or an embodiment initially with a flat top as in FIG. 3 but where the top tab 6 has been bowed upward as a first step in the opening procedure. The hatched area 8 in FIGS. 4–7 shows the area along which top sealing of the container is suitably achieved by sealing the opposing surfaces of the top tab. FIGS. 5 and 6 illustrate the first phase in the opening procedure, that is they show how the surfaces $PF_1M_1I_1$ and $QJ_1F_1M_1$ (FIG. 8*a*) are spread apart. This phase is carried out most simply by using two hands to grasp the tab parts **7*a* and 7*b* (which correspond to surfaces $PF_1M_1I_1$ and $QJ_1F_1M_1$ folded against each other), each between a corresponding thumb and forefinger, and then spreading the tab parts 7*a* and 7*b* as shown in FIG. 6. This spreading is facilitated by score lines or folding lines $K_1$–G and $L_1$–H (see FIG. 1). In this way slit 1, which was previously protected by both tab parts, is uncovered. Thereafter by using for example the nail of the forefinger one can grasp the lower edge of the slit and draw it outward. Assuming that the sealing strength between cover strip 2 and coating 3** of FIG. 8*b* is suitably adjusted, the seal between the lower edge of cover strip 2 and the coating 3 is loosened by pulling the lower edge of the slit outward (see FIG. 7) and an opening **7*c* with a spout 7*d* is obtained in the container. The cover strip 2 remains in essentially the same position as in the previous phase according to FIG. 6 but it does not prevent the container's contents from being poured out. After part of the contents has been poured out through spout 7*d*, reclosing of the container can be effected by partly pressing in the spout (which is actually the lower edge of the slit 1) and, due to the construction and resilience of the cardboard, the container top returns to the condition according to FIGURES 5 and 6. In this way it is possible to reclose the container's opening and thereby again protecting the spout from being soiled. After reclosing, the top of the container is naturally not completely liquid tight although the cover strip 2 tends to result in a certain amount of sealing of the reclosed container opening. However, complete sealing can be simply achieved on reclosing by coating appropriate areas of the cover strip 2 and corresponding areas of the inner surface of the container with cold sealing material for example. Then the pressure between the forefinger and thumb applied to the closed slit 1 is sufficient to achieve a tight sealing. Thus the hatched areas 5** in FIG. 8*c* could be coated with cold sealing material both on the inside of cover strip 2 and on the internal coating 3 of the carton and in this simple way the discussed resealing would be possible. Also other suitable surfaces on the cover strip and the corresponding parts on inside of the cardboard could be coated in order to achieve a similar effect. Naturally combinations of sealing with both hot and cold sealing materials are possible within the scope of the invention. Also hatched areas 5 (see FIG. 9*d*) comprise suitable surfaces for hot sealing and areas **12*a*** (FIG. 9*d*) could be suitably cold sealed.

Figure 7:
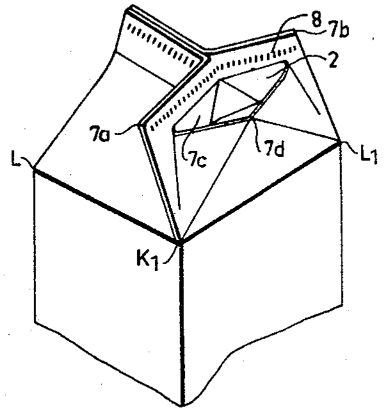

A further improvement is achieved if the cold sealing material covers all or suitable portions of the surface which corresponds to $PQI_1J_1$ in FIG. 8*a* or for example the hatched surface 8 in FIG. 7. In cartons which have received a protective outer coating of polyethylene for example, the surface $PF_1M_1I_1$ would tend to adhere to surface $QJ_1F_1M_1$ on heat sealing the top of the container if the internal sealing material also consisted of a thermo plastic material and this would give rise to difficulties on spreading apart the tab parts **7*a*, 7*b* of FIG. 5. By using a cold sealing coating on the mentioned surfaces or suitable parts thereof, the tab parts could be easily spread apart. On reclosing the container, when spout 7*d*** is folded back in, both tab parts with inner surfaces $PF_1M_1I_1$ and $QJ_1F_1M_1$ are again sealed against each other and the reclosed container appears as shown in FIG. 4. If as mentioned the outer coating of the carton material consists of a heat sealing substance, the above mentioned cold sealing coating of all or suitable parts of surfaces $PF_1M_1I_1$ and $QJ_1F_1M_1$ may be achieved simply by heat-pasting or heat-fastening a sheet of paper (which has one side coated with a layer of cold sealing material) against the mentioned surfaces with the cold sealing material turned away from the respective surfaces.

Figure 9A:
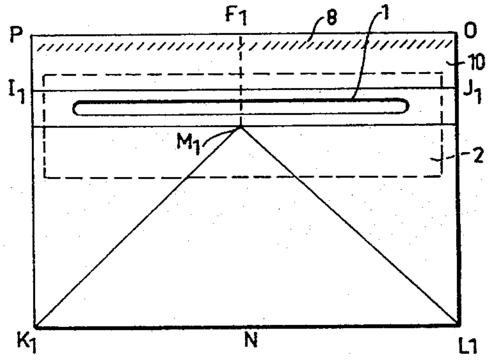
Figure 9B:
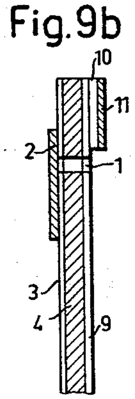
Figure 9C:
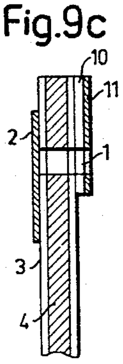

FIGS. 9*a*–9*d* illustrate such an embodiment of the invention. FIG. 9*a* corresponds to FIG. 8*a* but surfaces $PF_1M_1I_1$ and $QJ_1F_1M_1$ are externally covered with sheet 10 (which can be paper) the outward surface of which has a cold sealing covering 11 for the above mentioned resealing. FIG. 9*c* shows a further embodiment where the sheet 10 also covers the slit 1 so that the latter is sealed both internally and externally. It is also possible to use an external instead of an internal cover sheet or strip. According to FIG. 9*c* the slit 1 becomes accessible when the container is to be opened either by sheet 10 having an opening corresponding to slit 1 or by sheet 10 being so thin that it may be pierced for example by a finger nail to make an opening corresponding to slit 1. As earlier mentioned, of course, sheet 10 with its cold sealing material can be replaced by a cold sealing coating which is placed directly on the outer surface of the carton at the corresponding location. An outer layer 9 of plastic, wax, paraffin, or the like may be placed on the outer surface of the carton.

In any of the embodiments the slit 1 may be a discontinuous, interrupted slit composed of a plurality of perforations instead of the simple, continuous slit described. Also a plurality of rows of perforations may be used.

In the just described embodiments of the opening arrangement, the slit 1 is located in the cardboard material directly above fold-line I—I in FIG. 1. However this is not necessary. The slit may coincide with line I—I or as shown by dashed lines in FIG. 1 it may be located at I*e* at a small or greater distance below line I—I. FIG. 10*a*–10*c* (in principle corresponding to FIG. 8*a*–8*c*) shows more in detail the part of the cardboard material formed according to the last mentioned embodiment while FIGS. 18–19 show such a container in perspective view and the manner in which it is opened. FIG. 10*a* also shows an extra pair of folding lines $K_1$–Z and $L_1$–$Z_1$. If the cardboard material is prescored to facilitate bending, lines $K_1$–Z and $L_1$–$Z_1$ could also be suitably prescored to facilitate the formation of spout **7*d* four pouring. In the same way the above mentioned fold-lines $K_1$–G and $L_1$–H in FIG. 1 may be prescored to facilitate the folding out of pouring spout 7*d***.

A package with a slit **1*e*** as shown in FIG. 10 is opened in about the same way as shown for the other embodiments according to FIGURES 1, 8 or 9. The opening phase is illustrated in FIGS. 4–7. It is obvious that what has been said with reference to FIG. 9 concerning the cover sheet and its possible cold sealing and also the possible cold sealing of surfaces $PF_1M_1I_1$ and $QJ_1F_1M_1$ or parts thereof also may be applied to the same extent to the embodiment shown in FIG. 10.

Figure 11:
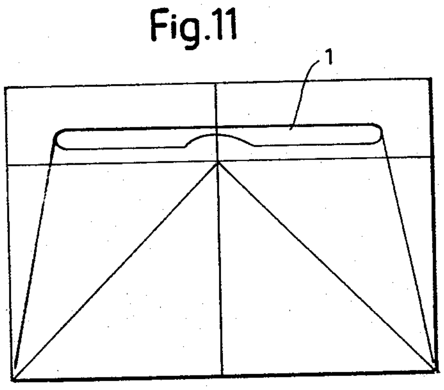
Figure 12:
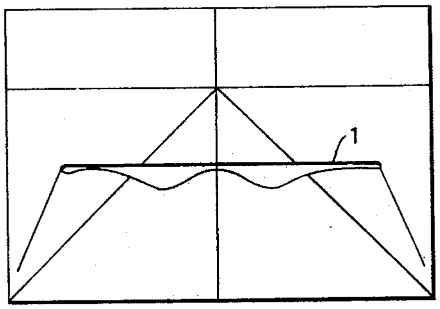
Figure 13:
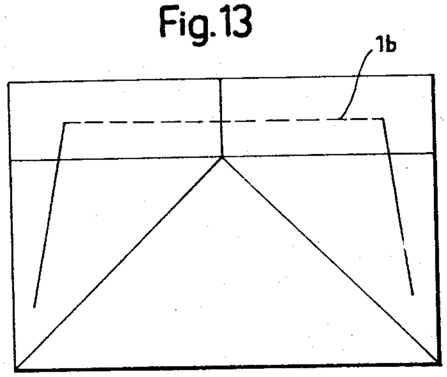
Figure 14:
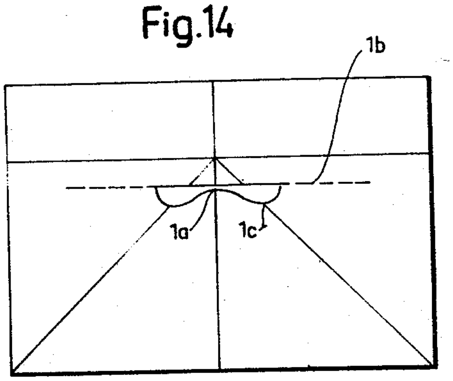

The embodiments so far described have slits formed by two straight parallel lines but other types of slits could be used. Any of the above embodiments with variously located slits, various types of cover strips, and various methods of sealing could incorporate a slit having a different shape. FIGURES 11, 12, 13 and 14 show various possible shapes for the slit. FIGURES 11 and 12 show slits furnished with tongues in order to facilitate opening by making it easier to grasp the edge of the slit in order to detach it from the cover strip. FIG. 13 shows a slit 1*b* consisting of a row of perforations in the cardboard. The perforating may be effected before or after possibly coating the inner surface of the cardboard with plastic. A perforated slit has the advantage that fewer stresses are applied to the cover strip while folding the carton. FIG. 14 shows a slit consisting of a punched portion 1*c* and a perforated portion 1*b*. The wider punch portion of the slit includes a tongue 1*a*.

The earlier discussed cover sheet can be made of various materials. For liquid tight packages it is advantageousful to use aluminum foil or liquid tight plastic foil as cover sheets. In contrast a plastic coated paper has the characteristic that the liquid may gradually be sucked into the edge of the cover sheet and in this way be spread through the sheet and soften it. Also aluminum has the advantage that by properly choosing the pressure, temperature and quality the cover sheet, during the opening process, will loosen its seal with the plastic coated inside of the carboard below slit 1 without destroying the plastic layer. However it is necessary to see to it that the plastic layer is more firmly anchored to the cardboard than it is anchored to the aluminum foil. In order to further reduce the risk of damaging the inside of the cardboard, the cover strip is sealed so that the area directly below the slit is left free from sealing as can be seen from the hatched area 5 in FIG. 8*c*. By means of these just mentioned steps the plastic coated inside of the cardboard is prevented from being destructed in the area directly below slit 1. This is important because this area forms the part of the spout which comes in contact with the container's contents when these contents are poured out.

FIGURES 15*a*–15*c*, 16 and 17 show a further embodiment of the invention. In principle FIGURES 15*a*–15*c* correspond to FIGURES 8*a*–8*c*. Here the slit is relatively wide and in addition to the usual cover sheet 2 fastened on inside there is another cover sheet 12 on the outside (see FIG. 15*b*). At least the inner cover sheet 2 suitably consists of aluminum foil and both cover sheets are in a suitable way connected to each other in the area 13, that is where the sheets meet in slit 1. The outer cover sheet is fastened relatively lightly to the outer surface of the cardboard. The opening of the package according to this embodiment is shown in FIGURES 16 and 17. The outer cover strip 12 is made accessible by bending outward the tab parts 7*a*, 7*b* so as to reveal their inner opposing surfaces $PF_1M_1I_1$ and $QJ_1F_1M_1$ as shown in FIG. 10 (cf. also FIG. 6). Since the outer ends of cover strip or sheet 12 are sealed against the carton's surface only lightly or not at all, it is easy to grasp the end of the strip between the thumb and forefinger. By then removing completely the strip 12 the section of sheet 2 which is sealed to sheet 12 is also removed together with sheet 12. This occurs if the strip 12 is tightly sealed to cover sheet 2 in the area 13 and if sheet 2 is not too strong in relation to strip 12. In this way slit 1 is uncovered by a simple tearing off manipulation and thereafter it is possible to fold out the dispensing spout.

It is obviously that an outer cover sheet may be mounted on any of the previously described opening arrangements according to the invention without sealing together the inner and outer cover sheets. This outer cover strip protects the slit from becoming soiled. After the outer strip has been removed, the opening procedure is the same as described earlier. For example one may use the finger tip to loosen the lower edge of the slit from its sealing with the inner cover sheet.

The above discussed embodiments of the invention are applicable to packages produced from continuous webs such as shown in U.S. patent application Serial No. 277,918. However, the applications of the invention are not limited to this type of packages. Thus for example the invention can be applied to packages produced from materials with folding lines which result in containers having rectangular but not square cross sections. For this purpose it is only necessary to make the distance $L$–$K_1$ and $L_1$–$K$ in FIG. 1 greater than distance $K$–$L$ and $K_1$–$L_1$.

Figure 2:
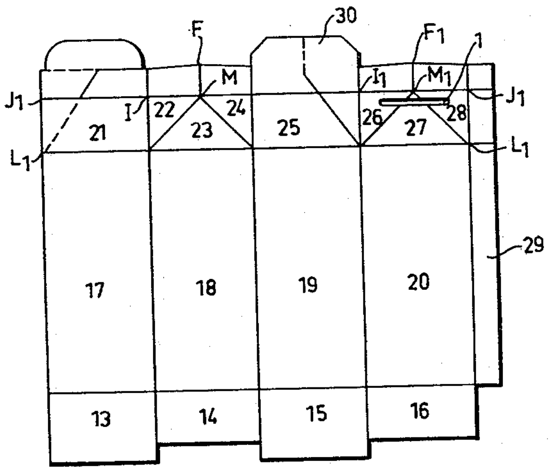

The invention can also be applied to packages which are produced from material such as shown in FIG. 2. By properly folding this material a bottom surface is formed from surfaces 13, 14, 15 and 16. Longitudinal sealing is obtained by fastening longitudinal flap 29 along the edge of surface 17. The four sides of the package are formed from surfaces 17, 18, 19 and 20. The top closure is obtained by bending the pairs of sides 21 and 25 and also 22–23–24 and 26–27–28 toward each other in known way so that the apexes on triangular portions 23 and 27 are moved toward each other while at the same time folds $F$–$M$ and $F_1$–$M_1$ are moved toward each other.

The invention can also be applied to containers the bottoms and lower parts of which are not square or rectangular. For example the bottom of the container may be circular while its upper part becomes rectangular or square in the immediate neighborhood of the top. In this case the top closure can be formed substantially according to the folding principles set out above.

The form and position of the slit and also the type of the cover sheet and the manner of sealing can be carried out in any of the suggested ways in all of the embodiments.

The invention can also be applied independently of how the actual sealing of the top occurs. It is easily realized that the invention can be applied whether the top sealing is effected by means of heat sealing along one or more lines above the folded top (see the hatched area 8 in FIG. 7) or by heat sealing after first folding a top strip over the upright top tab.

The invention may also be combined with any features disclosed in U.S. patent application Serial No. 277,918.

What is claimed is:

1. A container of sheet-like material having a tubular body closed at its lower end, a gable-type closure on the upper end of said body comprising a pair of side panels connectable with opposed sides of said body, a pair of end panels, said end panels being connectable to the sides of said body adjoining said opposed sides thereof, said end panels being foldable along horizontal folding lines so as to project over said body and define with said side panels a gable cavity at each end of said closure, said side panels being foldable so as to project over the end panels and to complete the gable-type closure, the confronting upper edge portions of said side and end panels being sealed together along generally aligned horizontal zones, one of said end panels containing a continuous slit in it, said slit extending along a line which is parallel to said folding lines, lying below and close to the sealing zones between the upper edges of the panels, and passing completely through the sheet-like material of said one end panel, a cover strip completely covering said slit and being sealed to the inside of said one end panel to completely seal said slit, each of said side panels being swingable away from each other to expose said one end panel, a portion of said one end panel being swingable outward from the tubular body to form a pouring spout, said pouring spout having a pouring edge which is formed by the lower edge of said slit, said cover strip remaining sealed to the upper edge of said slit when said portion of said one end panel swings out to form a pouring spout while the seal between the lower edge of said slit and said strip is broken.

2. The container of claim 1, wherein said end and side panels each includes two horizontal, parallel folding lines, the lower of said horizontal, parallel folding lines on each of said end and side panels being the folding line formed between the end and side panels and the respective sides of said tubular body, the upper of said horizontal, parallel folding lines on each of said end and side panels being located above said first horizontal, parallel folding line, the upper portion of each of said end and side panels above said upper folding lines being substantially vertical when the gable-type closure is sealed while the portions of each of said end panels below said upper folding lines are inclined to extend over the cross sectional area of the tubular body, said sealing zones being disposed between the confronting vertical surfaces of the said upper portions of the end and side panels and said continuous slit being located in the portion of said one end panel above said upper folding line and below the zone of sealing of the upper portion of said one end panel to the upper portions of the adjacent side panels of the closure.

3. A container of sheet-like material having a tubular body closed at one end, a gable-type closure on the opposite end of said body comprising a pair of side panels connectable with opposed sides of said body, a pair of end panels, said end panels being connectable to the sides of said body adjoining said opposed sides thereof, said end panels being foldable along folding lines so as to project over said body and define a gable cavity at each end of said closure, said side panels being foldable so as to project over end panels and to complete the gable-type closure, one of said end panels containing a continuous slit in it, said slit extending along a line which is parallel to said folding lines and passing completely through said sheet-like material, a cover strip completely covering said slit and being sealed to the inside of said one end panel to completely seal said slit, each of said side panels being swingable away from each other to expose said one end panel, a portion of said one end panel being swingable outward from the tubular body to form a pouring spout, said pouring spout having a pouring edge which is formed by the lower edge of said slit, said cover strip remaining sealed to the upper edge of said slit when said portion of said one end panel swings out to form a pouring spout while the seal between the lower edge of said slit and said strip is broken, and a second cover strip completely covering said slit and being sealed to the outside of said one end panel to completely seal said slit, said second cover strip being completely removable from the container when the container is opened.

4. A container of sheet-like material having a tubular body closed at one end, a gable-type closure on the opposite end of said body comprising a pair of side panels connectable with opposed sides of said body, a pair of end panels, said end panels being connectable to the sides of said body adjoining said opposed sides thereof, said end panels being foldable along folding lines so as to project over said body and define a gable cavity at each end of said closure, said side panels being foldable so as to project over end panels and to complete the gable-type closure, one of said end panels containing a continuous slit in it, said slit extending along a line which is parallel to said folding lines and passing completely through said sheet-like material, a cover strip completely covering said slit and being sealed to the inside of said one end panel to completely seal said slit, each of said side panels being swingable away from each other to expose said one end panel, a portion of said one end panel being swingable outward from the tubular body to form a pouring spout, said pouring spout having a pouring edge which is formed by the lower edge of said slit, said cover strip remaining sealed to the upper edge of said slit when said portion of said one end panel swings out to form a pouring spout while the seal between the lower edge of said slit and said strip is broken, the cover strip being sealed to the said one end panel by pressure sensitive adhesive, whereby upon folding the parts of the closure into its closed position and applying pressure to the portion thereof overlying the cover strip the cover strip is again sealed to said one end panel completely to seal such slit.

References Cited by the Examiner

UNITED STATES PATENTS

| | | | |
|---|---|---|---|
| 2,302,083 | 11/1942 | Wilcox | 229—7 |
| 2,661,138 | 12/1953 | Leonard | 229—17 |
| 3,167,231 | 1/1965 | Bray | 229—17 |
| 3,167,232 | 1/1965 | Patridge | 229—17 |
| 3,217,966 | 11/1965 | Kelly | 229—17 |
| 3,245,603 | 4/1966 | Wilcox | 229—17 |

FOREIGN PATENTS

| | | |
|---|---|---|
| 225,010 | 10/1956 | Austria. |

JOSEPH R. LECLAIR, *Primary Examiner.*

D. M. BOCKENEK, *Assistant Examiner.*